United States Patent [19]

Schroeder

[11] 4,254,169

[45] Mar. 3, 1981

[54] MULTI-LAYER BARRIER FILM

[75] Inventor: George O. Schroeder, Appleton, Wis.

[73] Assignee: American Can Company, Greenwich, Conn.

[21] Appl. No.: 973,943

[22] Filed: Dec. 28, 1978

[51] Int. Cl.³ .................. B32B 27/08; B65D 11/00
[52] U.S. Cl. ...................... 428/35; 428/500; 428/516; 428/518; 428/520; 428/522; 428/476.1
[58] Field of Search .............. 428/35, 411, 474, 500, 428/516, 518, 520, 522

[56] References Cited

U.S. PATENT DOCUMENTS

| | | | |
|---|---|---|---|
| 2,386,347 | 10/1945 | Roland, Jr. | 260/86 |
| 2,399,653 | 5/1946 | Roland, Jr. | 260/88 |
| 2,541,478 | 2/1951 | Nadeau et al. | 428/507 |
| 2,941,973 | 6/1960 | Kumnick et al. | 260/30.6 |
| 2,983,696 | 5/1961 | Tocker | 260/23 |
| 3,114,736 | 12/1963 | Bartl et al. | 260/87.3 |
| 3,172,876 | 3/1965 | Koch et al. | 260/85.7 |
| 3,344,129 | 9/1967 | Korbanka et al. | 260/87.3 |
| 3,386,978 | 6/1968 | Salyer | 260/87.3 |
| 3,419,654 | 12/1968 | Chiba et al. | 264/210 |
| 3,510,463 | 5/1970 | Bristol | 260/87.3 |
| 3,510,464 | 5/1970 | Sato | 260/87.3 |
| 3,523,933 | 8/1970 | Inskip | 260/89.1 |
| 3,560,325 | 2/1971 | Sogi | 428/333 |
| 3,560,325 | 2/1971 | Sogi et al. | 428/216 |
| 3,560,461 | 2/1971 | Yonezu et al. | 260/87.3 |
| 3,562,234 | 2/1971 | Resz et al. | 260/87.3 |
| 3,585,177 | 6/1971 | Gardner et al. | 260/87.3 |
| 3,595,740 | 7/1971 | Gerow et al. | 428/520 |
| 3,780,004 | 12/1973 | Hoyt | 260/87.3 |
| 3,847,845 | 11/1974 | Tada | 521/62 |
| 3,882,259 | 5/1975 | Nohara | 428/35 |
| 3,887,649 | 6/1975 | Takida et al. | 260/42.18 X |
| 3,890,267 | 6/1975 | Fukashima et al. | 260/42.18 |
| 3,925,336 | 12/1975 | Sawada | 260/87.3 |
| 3,926,876 | 12/1975 | Fukushima et al. | 260/23 R |
| 3,931,449 | 1/1976 | Hirata et al. | 428/474 |
| 3,932,692 | 1/1976 | Hirata et al. | 428/474 |
| 3,932,693 | 1/1976 | Shaw | 428/518 |
| 3,949,114 | 4/1976 | Viola | 428/337 |
| 3,957,941 | 5/1976 | Kawaguchi | 264/234 |
| 3,972,865 | 8/1976 | McClain | 526/14 |
| 3,976,618 | 8/1976 | Takida | 260/40 R |
| 3,985,719 | 10/1976 | Hoyt et al. | 526/10 |
| 4,003,810 | 1/1977 | Hoyt et al. | 204/159.14 |
| 4,003,963 | 1/1977 | Creasy | 264/289 X |
| 4,044,187 | 8/1977 | Kremkau | 428/212 |
| 4,055,698 | 10/1977 | Beery | 428/518 |
| 4,058,647 | 11/1977 | Inoue et al. | 428/500 X |
| 4,058,904 | 11/1977 | Takida | 34/12 |
| 4,064,296 | 12/1977 | Bornstein et al. | 428/35 |
| 4,079,850 | 3/1978 | Suzuki et al. | 215/1 C |
| 4,082,854 | 4/1978 | Yamada | 428/518 X |
| 4,087,587 | 5/1978 | Shida et al. | 428/500 |
| 4,087,588 | 5/1978 | Shida et al. | 428/500 |

FOREIGN PATENT DOCUMENTS 593929 10/1947 United Kingdom.
634140 3/1950 United Kingdom.
1057398 2/1967 United Kingdom.

*Primary Examiner*—Lorraine T. Kendell
*Attorney, Agent, or Firm*—Robert P. Auber; Stuart S. Bowie; James W. Bock

[57] ABSTRACT

A delamination resistant multi-layer film comprises a core layer of vinyl alcohol polymers or copolymers such as polyvinyl alcohol or ethylene vinyl alcohol. Adhered to the core layer are one or more layers of a polyolefin blended with a chemically modified polyolefin having functional groups added to the basic polymer such that strong adhesion to the core layer is obtained. The core layer provides an excellent oxygen barrier, while the adjacent layers protect the core layer from degradation by exposure to water vapor. Additional layers of various polymer materials may be provided over the layers of modified polyolefin. The film can be prepared by coextrusion techniques.

36 Claims, No Drawings

MULTI-LAYER BARRIER FILM

BACKGROUND OF THE INVENTION

1. Field of the Invention

This invention pertains generally to multi-layer polymer films and to methods for producing the same.

2. Description of the Prior Art

Polyolefin films such as polyethylene and polypropylene are commom packaging materials because of their relative low cost, heat sealability, and moisture resistance. However, these polyolefins have a fairly high permeability to gases including oxygen, so that, used alone, they are not adequate for packaging oxygen sensitive foods and other materials that degrade in the presence of oxygen or other atmospheric gases.

It is known that polymers and copolymers of vinyl alcohol, hereafter called vinyl alcohol films, have excellent resistance to permeation by gases, particularly to oxygen. Vinyl alcohol films include polyvinyl alcohol and ethylene vinyl alcohol copolymer. The desirable properties of the vinyl alcohol films degrade in the presence of moisture. Vinyl alcohol films also tend to be structurally brittle, particularly when formed in relatively thin layers, i.e. in the range of 1 mil or less. Thus, efforts have been made to laminate a vinyl alcohol web between two outer webs of polyolefin which provide a moisture barrier, and structural support for the vinyl alcohol core. An example of such a structure, a core layer of ethylene vinyl alcohol blended with another polymer and sandwiched between two outer layers of polyolefin, is shown in the U.S. Pat. to Nohara, et. al., No. 3,882,259. Since the oxygen barrier property of substantially pure vinyl alcohol polymer is superior to that of vinyl alcohol blends, it is desirable to produce a film having a substantially pure vinyl alcohol layer within polyolefin layers. However, substantially pure ethylene vinyl alcohol and polyvinyl alcohol do not bond well to many polymer films, particularly polyolefin films.

SUMMARY OF THE INVENTION

This invention provides a film structure in which a substantially pure polyvinyl alcohol or ethylene vinyl alcohol layer is joined with one or more polyolefin layers with adequate adhesion to prevent delamination.

A multi-layer film in accordance with the invention includes a core layer of substantially pure vinyl alcohol polymer or copolymer such as polyvinyl alcohol (PVOH) or ethylene vinyl alcohol copolymer (EVOH) adhered to at least one layer of chemically modified polyolefin having surprisingly strong adhesion characteristics to the vinyl alcohol core layer. The multilayer film can be made by coextrusion. Because the core layer is formed of substantially pure polyvinyl alcohol or ethylene vinyl alcohol, the entire film may be made very thin while still retaining high oxygen impermeability. The modified polyolefin layer and the core may be coextruded with additional layers of other polymers to provide an integrated film structure having a composite of the characteristics of the various films in the structure and which has sufficient adhesion between layers to resist delamination.

The modified polyolefins that have been found to have suitable adhesion to the vinyl alcohol core layer are blends of a polyolefin and a graft copolymer of high density polyethylene having an unsaturated fused ring carboxylic acid anhydride grafted thereto. The polyolefin component of the blend may be polyethylene or ethylene copolymers such as ethylene vinyl acetate. Such modified polyolefins have shown a marked ability to adhere to vinyl alcohol materials, particularly to ethylene vinyl alcohol when coextruded therewith.

The atmospheric gas barrier layer is preferably ethylene vinyl alcohol which is readily coextrusible with the modified polyolefin layers and with additional layers. Dry ethylene vinyl alcohol copolymer is very much less permeable to oxygen than extrusion grade saran (vinylidine chloride). Heretofor, saran has been dominant in the field of oxygen barrier materials for films. The lower oxygen permeability of EVOH allows it to be used as a very thin layer. Polyvinyl alcohol also displays superior barrier properties, but is less easy to coextrude. Polyvinyl alcohol is better suited to laminated film structures wherein a polyvinyl alcohol core web is extrusion coated or otherwise plied with the adherent modified polyolefin layers.

In a preferred process for the production of the multi-layer film, resins of the modified polyolefin and the core barrier material are melted and coextruded as a cast film. Additional layers of polymer material similarly may be coextruded over the modified polyolefin layers. Blown film coextrusion and water quench coextrusion may also be utilized. All such coextrusion processes yield a multi-layer film which has excellent adhesion between the layers and high resistance to passage of gas and moisture. Heat sealing of polyolefin outer layers is readily obtained. Thus, the multi-layer film product is well adapted to use in packaging food products as well as many non-food products which require moisture and oxygen barrier packaging.

Further objects, features, and advantages of the invention will be apparent from the following detailed description illustrating preferred embodiments of the invention.

DESCRIPTION OF THE PREFERRED EMBODIMENTS

The multi-layer film of the invention includes a core of substantially pure polyvinyl alcohol (PVOH), or ethylene vinyl alcohol (EVOH). Excellent adhesion of the layers in the film is obtained without the need to introduce bond promoting materials into the core layer, and it is highly preferred that they be eliminated from the core layer since introduction of such extraneous materials may reduce the oxygen barrier properties of the core. As a result, the core layer may be made quite thin, in the range of 0.1 mil or less, while still obtaining adequate oxygen barrier properties.

Vinyl alcohol polymers and copolymers suitable for extrusion are available commercially. Kuraray of Japan produces an ethylene vinyl alcohol copolymer under the designation "EP-F" which has 32 to 36% ethylene, a molecular weight of 29,500 and a melting point of 356° F. Other manufacturers produce suitable ethylene vinyl alcohol copolymers. One suitable copolymer has about 29% ethylene, a molecular weight of 22,000, and a melting point of 365° F. Another has about 40% ethylene, a molecular weight of 26,000, and a melting point of 327° F. The film structures reported in the tables which follow were made with these commercial EVOH resins.

The modified polyolefins which form the layers adjacent the core layer are blends of polyolefin and a graft copolymer of high density polyethylene (HDPE) with an unsaturated fused ring carboxylic acid anhydride.

The polyolefin component of the blend may include a number of resins such as high, medium and low density polyethylene (HDPE, MDPE, LDPE), and polyolefin copolymers such as ethylene vinyl acetate copolymer (EVA) and ethylene acrylic acid (EAA). Modified polyolefin blends are disclosed in U.S. Pat. Nos. 4,087,587 and 4,087,588. Suitable modified polyolefin blends are available from the Chemplex Company of Rolling Meadows, Illinois under the name Plexar. Commercially available grades of such modified polyolefins are blends of the graft copolymer with different polyolefins. These include Plexar-I, a blend with ethylene vinyl acetate copolymer; Plexar-II, a blend with high density polyethylene; Plexar-II further modified with an elastomer such as polyisobutylene; and Plexar-III, a blend with ethylene vinyl acetate polymer adapted for cast film coextrusion. It has been found that these materials coextrude well with extrusion grades of ethylene vinyl alcohol without need for adding materials to either the polyolefin or the core layers in order to obtain the desired level of adhesion between layers.

Other materials used for layers overlying the modified polyolefin layers, include by way of illustration, high, medium and low density polyethylene, polypropylene, modified polyolefins, polyolefin copolymers such as ethylene vinyl acetate copolymer and ethylene acrylic acid copolymer, blends two or more of the foregoing polymers, nylon, and ionomers such as those sold under the name "Surlyn" by duPont. Five or more layers can be coextruded to produce a film having a plurality of desired properties in a single pass.

Examples of coextruded film structures in accordance with the present invention which have been made and tested are reported in the following tables. Table I reports oxygen permeability for the various structures. The permeability is expressed as milliliters of oxygen which pass through a square meter of the structure during a 24 hour period. The permeabilities are reported at different humidities. Table II reports the adhesion between layers of various structures. The data was obtained using an Instron test device which reveals the force in grams per inch of film width required to separate a film structure.

TABLE I

OXYGEN PERMEABILITY

| Example Number | Film Structure | Thickness (mils) | $O_2$ Permeability (ml/$M^2$/24 hrs) ml | °F. | % RH |
|---|---|---|---|---|---|
| 1 | 45% Plexar I + slip/10% EVOH/45% Plexar I + slip | 1.0 | 0.2 | 45° | 0 |
| | | | 1.8 | 73 | 0 |
| | | | 2.56 | 73 | 50 |
| | | | 24 | 73 | 100 |
| 2 | 45% Plexar I + slip/10% EVOH/45% Plexar I + slip | 3.0 | 1.95 | 73 | 50 |
| 3 | 1.35 Plexar III/0.3 EVOH/1.35 Plexar III + slip | 3.0 | 1.3 | 73 | 50 |
| 4 | 1.75 Plexar IIIB + slip/0.2 Plexar IIIB/0.7 EVOH/ 0.2 Plexar IIIB/1.75 Plexar III + slip | | 1 | 73 | 50 |
| 5 | HDPE/Plexar III/EVOH/Plexar III/EVA blend | 1.30 | 2.0 | 73 | 50 |
| 6 | Plexar III/EVOH/Plexar III | 1.56 | 1.3 | 73 | 50 |
| 7 | EVA/Plexar III/EVOH/Plexar III/EVA | 1.48 | 0.67 | 73 | 50 |
| 8 | LDPE/Plexar III/EVOH/Plexar III/LDPE | 1.53 | 0.88 | 73 | 50 |
| 9 | 30% nylon/10% EVOH/20% Plexar III/40% EVA approx. | 3.0 | 3.4 | 73 | 50 |
| | | | 0.49 | 73 | 0 |
| | | | 67.0 | 73 | 100 |
| 10 | 30% nylon/10% EVOH/20% Plexar/40% Surlyn approx. | 3.0 | 2-4 | 73 | 0 |
| 11 | nylon/EVOH/Plexar/Surlyn | 3.34 | 93.0 | 73 | 100 |
| | | | 9.8 | 73 | 0 |
| 12 | nylon/EVOH/Plexar/Surlyn | 3.18 | 71.0 | 73 | 100 |
| | | | 3.5 | 73 | 0 |
| 13 | nylon/EVOH/Plexar/Surlyn | 3.04 | 66.0 | 73 | 100 |
| | | | 2.2 | 73 | 0 |
| 14 | nylon 6/EVOH/Plexar I | 3.09 | 72.0 | 73 | 100 |
| | | | 1.7 | 73 | 0 |
| 15 | nylon 6/EVOH/Plexar I | 3.13 | 50.0 | 73 | 100 |
| | | | 2.8 | 73 | 0 |
| 16 | nylon 6/EVOH/Plexar I | 2.92 | 49.0 | 73 | 100 |
| | | | 11.0 | 73 | 0 |
| 17 | 0.74 Plexar I/0.34 EVOH/0.74 Plexar I | 1.82 | 4.5 | 73 | 100 |
| 18 | 0.73 Plexar I/0.34 EVOH/0.68 Plexar I | 1.75 | 4.0 | 73 | 100 |
| 19 | 0.5 Plexar I/.5 EVOH/0.76 Plexar I | 1.76 | 0.6 | 73 | 0 |
| 20 | 0.53 Plexar I/0.38 EVOH/0.77 Plexar I | 1.68 | 0.6 | 73 | 0 |
| 21 | Plexar III/EVOH/Plexar (500 ppm slip) | 3.34 | 6.0 | 73 | 100 |
| 22 | 30% nylon/10% EVOH/20% Plexar III/40% EVA | 3.25 | 152.0 | 73 | 100 |
| 23 | HDPE/Plexar 1591A/EVOH/Plexar 1591A/EVA blend | 1.75 | 5.7 | 73 | 50 |
| 24 | LDPE/Plexar 1591A/EVOH/Plexar 1591A/LDPE | 1.57 | 5.0 | 73 | 50 |
| 25 | Plexar III/EVOH/Plexar III (500 ppm slip) | 2.9 | 6.0 | 73 | 100 |
| 26 | Plexar/EVOH/Plexar | 2.97 | 64.0 | 73 | 100 |
| 27 | Plexar/EVOH/Plexar | 4.6 | 22.0 | 73 | 100 |
| 28 | 43% Plexar I + pigment/14% EVOH/43% Plexar I + pgmt. + slip | 2.0 | 1 | 73 | 50 |
| 29 | 30% nylon/10% EVOH/20% Plexar/40% Surlyn | 3.0 | 3.4 | 73 | 0 |
| | | | 4.4 | 73 | 50 |
| | | | 107 | 73 | 100 |
| 30 | 30% nylon/10% EVOH/20% Plexar/40% Surlyn | 3.0 | 10. | 73 | 0 |
| | | | 117. | 73 | 100 |
| 31 | 30% nylon/10% EVOH/20% Plexar/40% Surlyn | 3.0 | 3.5 | 73 | 0 |
| | | | 116 | 73 | 100 |
| 32 | 30% nylon/10% EVOH/20% Plexar/40% Surlyn | 3.0 | 114 | 73 | 100 |
| 33 | 33% nylon 666/15% EVOH/52% Plexar I | 3.09 | 33 | 73 | 100 |

TABLE I-continued
OXYGEN PERMEABILITY

| Example Number | Film Structure | Thickness (mils) | O$_2$ Permeability (ml/M$^2$/24 hrs) ml | °F. | % RH |
|---|---|---|---|---|---|
| 34 | 3.0 Plexar/0.75 EVOH/1.25 Plexar | 4.95 | 1.4 | 73 | 100 |
| 35 | 0.8 Plexar/0.8 EVOH/0.8 Plexar | 2.5 | 2.9 | 73 | 100 |

TABLE II
ADHESION BETWEEN LAYERS

| Example Number | Film Structure | Adhesion Gramper inch @ 90° |
|---|---|---|
| 36 | Same as Example 1 | 190 |
| 37 | Same as Example 2 | 122 |
| 38 | Same as Example 33 | 48 |
| 39 | 30% nylon/10% EVOH/20% Plexar III/40% Surlyn 1601-B | 61-75 (Plexar-EVOH) |
| 40 | Plexar III/EVOH/Plexar III | 98 |
| 41 | LDPE/Plexar III/EVOH/Plexar III/LDPE | 170 |
| 42 | EVA/Plexar III/EVOH/Plexar III/EVA | 163 |
| 43 | 43% Plexar I/ 14% EVOH/ 43% Plexar I | 99 |
| 44 | 43% Plexar I + pigment/14% EVOH/43% Plexar I + pigment | 57 |
| 45 | 43% Plexar I + pigment/14% EVOH/43% Plexar I + pigment | 53 |
| 46 | 43% Plexar RMB 1541 + pigment/14% EVOH/43% Plexar RMB 1541 + pigment | 65 |
| 47 | 43% Plexar RMB 1632 + pigment/14% EVOH/43% Plexar RMB 1632 + pigment | 594 |
| 48 | Plexar III/EVOH/Plexar 1774-A | 284 (1774-EVOH)<br>177 (III-EVOH) |
| 49 | Plexar III/EVOH/Plexar 1774-B | 341 (1774-EVOH)<br>166 (III-EVOH) |
| 50 | 60% LDPE/7.5% Plexar/10% EVOH/7.5% Plexar/EVA blend | 213-252 |
| 51 | 60% LDPE/7.5% Plexar/10% EVOH/7.5% Plexar/EVA blend | 291-329 |
| 52 | Same as Example 29 | 78 (Plexar-EVOH)<br>393 (Plexar-Surlyn)<br>DNS (nylon-EVOH) |

In the tables "slip" means that a slip material such as SiO$_2$ (Union Carbide 0291) has been added to the outer surface layers to make the surface more slippery. Pigments such as Ampacet 11078 have been added to some layers. "DNS" means that the sample did not separate in the adhesion test.

Containers were made from the films of the examples by heat sealing to form a pouch or by thermoforming to make containers in which foods were packaged and stored to evaluate the performance of the films. The containers were successful.

I claim:

1. A delamination resistant multi-layer structure comprising a barrier layer of a substantially pure polymer or copolymer of vinyl alcohol adhered directly to a layer of a modified polyolefin which consists essentially of a polyolefin polymer or copolymer blended with a graft copolymer of polyethylene and an unsaturated fused ring carboxylic acid anhydride.

2. The multi-layer structure of claim 1 wherein the barrier layer is located between layers of the modified polyolefin.

3. The multi-layer structure of claim 1 wherein a further layer of a polymer is adhered to the modified polyolefin.

4. The multi-layer structure of claim 2 wherein a further layer of polymer is adhered to at least one of the modified polyolefin layers.

5. The multi-layer structure of claim 1 wherein the barrier layer is ethylene vinyl alcohol copolymer.

6. The multi-layer structure of claim 1 wherein the barrier layer is polyvinyl alcohol.

7. The multi-layer structure of claim 1 wherein the modified polyolefin layer consists essentially of polyethylene blended with the graft copolymer of polyethylene.

8. The multi-layer structure of claim 1 wherein the modified polyolefin layer consists essentially of ethylene vinyl acetate blended with the graft copolymer of polyethylene.

9. The multi-layer structure of claim 3 wherein the further layer is a polyolefin.

10. The multi-layer structure of claim 3 wherein the further layer is nylon.

11. The multi-layer structure of claim 3 wherein the further layer is ethylene vinyl acetate copolymer.

12. The multi-layer structure of claim 3 wherein the further layer is an ionomer.

13. A delamination resistant coextruded multi-layer structure comprising a barrier layer of substantially pure ethylene vinyl alcohol copolymer located between adjacent layers consisting essentially of a modified polyolefin which consists of a polyolefin polymer or copolymer blended with a graft copolymer of polyethylene and an unsaturated fused ring carboxylic acid anhydride.

14. The multi-layer structure of claim 13 wherein the modified polyolefin consists essentially of polyethylene blended with the graft copolymer.

15. The multi-layer structure of claim 13 wherein the modified polyolefin consists essentially of ethylene vinyl acetate blended with the graft copolymer.

16. The multi-layer structure of claim 14 having a further layer over at least one of the modified polyolefin layers comprising a polymer selected from the group consisting of polyethylene, polypropylene, ethylene vinyl acetate copolymer, ethylene acrylic acid copolymer, blends of two or more of the foregoing polymers, nylon, and ionomers.

17. The multi-layer structure of claim 15 having a further layer over at least one of the modified polyolefin layers comprising a polymer selected from the group consisting of polyethylene, polypropylene, ethylene vinyl acetate copolymer, ethylene acrylic acid copolymer, blends of two or more of the foregoing polymers, nylon, and ionomers.

18. A delamination resistant coextruded multi-layer structure comprising
   (a) a substantially pure ethylene vinyl alcohol copolymer core layer;
   (b) a modified polyolefin layer on each side of and adjacent the core layer, the modified polyolefin consisting essentially of a graft copolymer of polyethylene and an unsaturated fused ring carboxylic acid anhydride blended with a polyolefin selected from the group consisting of polyethylene and ethylene vinyl acetate copolymer;
   (c) an outer polymer layer over at least one of the modified polyolefin layers, the outer layers being independently selected from the group which consists of polyethylene, polypropylene, ethylene vinyl acetate copolymer, ethylene acrylic acid copolymer, blends of two or more of the foregoing polymers, nylon, and ionomers.

19. A delamination resistant coextruded multi-layer structure comprising a barrier layer of substantially pure ethylene vinyl alcohol copolymer located between adjacent layers of a modified polyolefin which consists essentially of a blend of ethylene vinyl acetate copolymer and a graft copolymer of high density polyethylene and an unsaturated fused ring carboxylic acid anhydride.

20. The multi-layer structure of claim 19 wherein a further layer of a polymer is coextruded over at least one of the modified polyolefin layers.

21. The multi-layer structure of claim 20 wherein the further layer is polyethylene.

22. The multi-layer structure of claim 20 wherein the further layer is ethylene vinyl acetate copolymer.

23. The multi-layer structure of claim 20 wherein the further layer is an ionomer.

24. The multi-layer structure of claim 20 wherein the further layer is nylon.

25. The multi-layer structure of claim 20 wherein one further layer is nylon and another further layer over the other modified polyolefin layer is an ionomer.

26. The multi-layer structure of claim 20 wherein one further layer is nylon and another further layer over the other modified polyolefin layer is ethylene vinyl acetate copolymer.

27. A delamination resistant coextruded multilayer structure comprising a barrier layer of substantially pure ethylene vinyl alcohol copolymer and an adjacent layer of modified polyolefin which consists essentially of a blend of ethylene vinyl acetate copolymer and a graft copolymer of high density polyethylene and an unsaturated fused ring carboxylic acid anhydride.

28. The multi-layer structure of claim 27 wherein nylon is coextruded on one face of the barrier layer and the modified polyolefin is coextruded on the other face.

29. The multi-layer structure of claim 28 wherein an ionomer is coextruded over the modified polyolefin layer.

30. The multi-layer structure of claim 28 wherein ethylene vinyl acetate copolymer is coextruded over the modified polyolefin layer.

31. A container formed from the structure of claim 1.

32. A container formed from the structure of claim 13.

33. A container formed from the structure of claim 18.

34. A container formed from the structure of claim 29.

35. A container formed from the structure of claim 30.

36. A multi-layer structure according to claim 27 wherein the barrier layer is 0.1 mils in thickness.

* * * * *